United States Patent
Heo et al.

(10) Patent No.: US 11,038,353 B2
(45) Date of Patent: Jun. 15, 2021

(54) APPARATUS AND METHOD FOR CONTROLLING OUTPUT OF ENERGY STORAGE APPARATUS FOR RELIABILITY OF OUTPUT OF PHOTOVOLTAIC POWER GENERATION

(71) Applicant: ELECTRONICS AND TELECOMMUNICATIONS RESEARCH INSTITUTE, Daejeon (KR)

(72) Inventors: Sewan Heo, Daejeon (KR); Wan Ki Park, Daejeon (KR); Jinsoo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/833,946

(22) Filed: Mar. 30, 2020

(65) Prior Publication Data

US 2021/0151987 A1 May 20, 2021

(30) Foreign Application Priority Data

Nov. 18, 2019 (KR) .......................... 10-2019-0147320

(51) Int. Cl.
*H02J 3/32* (2006.01)
*H02J 3/00* (2006.01)
(Continued)

(52) U.S. Cl.
CPC ................ *H02J 3/32* (2013.01); *G06N 20/00* (2019.01); *H02J 3/004* (2020.01); *H02J 3/381* (2013.01); *H02J 7/007* (2013.01); *H02J 2300/24* (2020.01)

(58) Field of Classification Search
CPC .... H02J 3/32; H02J 3/004; H02J 3/381; H02J 7/007; H02J 2300/24; G06N 20/00
(Continued)

(56) References Cited

U.S. PATENT DOCUMENTS

| 9,608,438 B2 | 3/2017 | Chu |
| 9,979,197 B2 | 5/2018 | Kim et al. |
| 2013/0207466 A1* | 8/2013 | Lee ........................... H02J 3/28 307/23 |

FOREIGN PATENT DOCUMENTS

| KR | 10-1777821 B1 | 9/2017 |
| KR | 10-2017-0129456 A | 11/2017 |

(Continued)

*Primary Examiner* — Hal Kaplan
(74) *Attorney, Agent, or Firm* — LRK Patent Law Firm

(57) ABSTRACT

An output controlling apparatus of an energy storage apparatus for a reliability of an output of a photovoltaic power generation is provided. The output controlling apparatus includes a power generation amount predictor configured to predict a next day's power generation amount of a photovoltaic power generator, a target output generator configured to determine a target output based on a charging state of an energy storage apparatus used for a photovoltaic power generation, a real-time output criterion generator configured to generate an output criterion used for outputs from the photovoltaic power generator and the energy storage apparatus to a system in units of time based on the target output and the charging state of the energy storage apparatus, and a charging/discharging controller configured to control charging and discharging of the energy storage apparatus such that an output to the system follows the output criterion.

10 Claims, 6 Drawing Sheets

(51) Int. Cl.
  *H02J 7/00* (2006.01)
  *G06N 20/00* (2019.01)
  *H02J 3/38* (2006.01)

(58) Field of Classification Search
  USPC .................................................. 307/64, 66
  See application file for complete search history.

(56) References Cited

FOREIGN PATENT DOCUMENTS

KR   10-2018-0066438 A   6/2018
  KR   10-2019-0057716 A   5/2019

* cited by examiner

APPARATUS AND METHOD FOR CONTROLLING OUTPUT OF ENERGY STORAGE APPARATUS FOR RELIABILITY OF OUTPUT OF PHOTOVOLTAIC POWER GENERATION

CROSS-REFERENCE TO RELATED APPLICATION(S)

This application claims the benefit of Korean Patent Application No. 10-2019-0147320, filed on Nov. 18, 2019, in the Korean Intellectual Property Office, the disclosure of which is incorporated herein by reference.

BACKGROUND

1. Field of the Invention

One or more example embodiments relate to an apparatus and method for controlling an output of an energy storage apparatus for a reliability of an output of a photovoltaic power generation, and more particularly, to an apparatus for controlling an output of an energy storage apparatus by setting a target output and by generating a real-time output criterion based on the target output.

2. Description of Related Art

Light of the sun is a most widely used energy source as one of energy sources used instead of fossil fuel. Since a photovoltaic power generation is affected by a solar intensity, a temperature or weather, an amount of power generated by the photovoltaic power generation is variable and it is difficult to control the amount of power generated.

Accordingly, it is difficult to perform the photovoltaic power generation according to a power generation plan even when a photovoltaic power station has a power generation plan on the day. Thus, there is a desire for a technology of allowing a photovoltaic power generator to follow a power generation plan on the day.

SUMMARY

An aspect provides an apparatus and method for controlling an output of an energy storage apparatus for a reliability of an output of a photovoltaic power generation. Another aspect provides an apparatus and method for allowing a photovoltaic power generator to generate power based on a planned target output by modifying an output criterion and the target output based on a charging state of an energy storage apparatus.

According to an aspect, there is provided an output controlling apparatus including a power generation amount predictor configured to predict a next day's power generation amount of a photovoltaic power generator, a target output generator configured to determine a target output in units of time based on the predicted next day's power generation amount and to modify the target output based on a charging state of an energy storage apparatus used for a photovoltaic power generation, a real-time output criterion generator configured to generate an output criterion used for outputs from the photovoltaic power generator and the energy storage apparatus to a system in units of time based on the target output and the charging state of the energy storage apparatus, and a charging/discharging controller configured to control charging and discharging of the energy storage apparatus such that an output to the system follows the output criterion.

The power generation amount predictor may be configured to predict the next day's power generation amount through a deep learning, based on weather information and information collected by monitoring power generated from the photovoltaic power generator.

When the charging state of the energy storage apparatus is greater than a preset reference state, the target output generator may increase the target output. When the charging state of the energy storage apparatus is less than the preset reference state, the target output generator may reduce the target output.

When the charging state of the energy storage apparatus is greater than a preset reference state, the real-time output criterion generator may set the output criterion to be greater than the target output. When the charging state of the energy storage apparatus is less than the preset reference state, the real-time output criterion generator may set the output criterion to be less than the target output.

When an output from the photovoltaic power generator to the system increases, the charging/discharging controller may reduce an output of the energy storage apparatus to the system. When the output from the photovoltaic power generator to the system decreases, the charging/discharging controller may increase the output of the energy storage apparatus to the system.

According to another aspect, there is provided an output controlling method including predicting a next day's power generation amount of a photovoltaic power generator, determining a target output in units of time based on the predicted next day's power generation amount, modifying the target output based on a charging state of an energy storage apparatus used for a photovoltaic power generation, generating an output criterion used for outputs from the photovoltaic power generator and the energy storage apparatus to a system in units of time based on the target output and the charging state of the energy storage apparatus, and controlling charging and discharging of the energy storage apparatus such that an output to the system follows the output criterion.

The predicting of the next day's power generation amount may include predicting the next day's power generation amount through a deep learning, based on weather information and information collected by monitoring power generated from the photovoltaic power generator.

The modifying of the target output may include increasing the target output when the charging state of the energy storage apparatus is greater than a preset reference state, and reducing the target output when the charging state of the energy storage apparatus is less than the preset reference state.

The generating of the output criterion in units of time may include setting the output criterion to be greater than the target output when the charging state of the energy storage apparatus is greater than a preset reference state, and setting the output criterion to be less than the target output when the charging state of the energy storage apparatus is less than the preset reference state.

The controlling of the charging and discharging of the energy storage apparatus may include reducing an output of the energy storage apparatus to the system when an output from the photovoltaic power generator to the system increases, and increasing the output of the energy storage apparatus to the system when the output from the photovoltaic power generator to the system decreases.

Additional aspects of example embodiments will be set forth in part in the description which follows and, in part, will be apparent from the description, or may be learned by practice of the disclosure.

Example embodiments provide an apparatus and method for controlling an output of an energy storage apparatus for a reliability of an output of a photovoltaic power generation. According to example embodiments, it is possible to allow a photovoltaic power generator to generate power based on a planned target output by modifying the target output and an output criterion based on a charging state of an energy storage apparatus.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
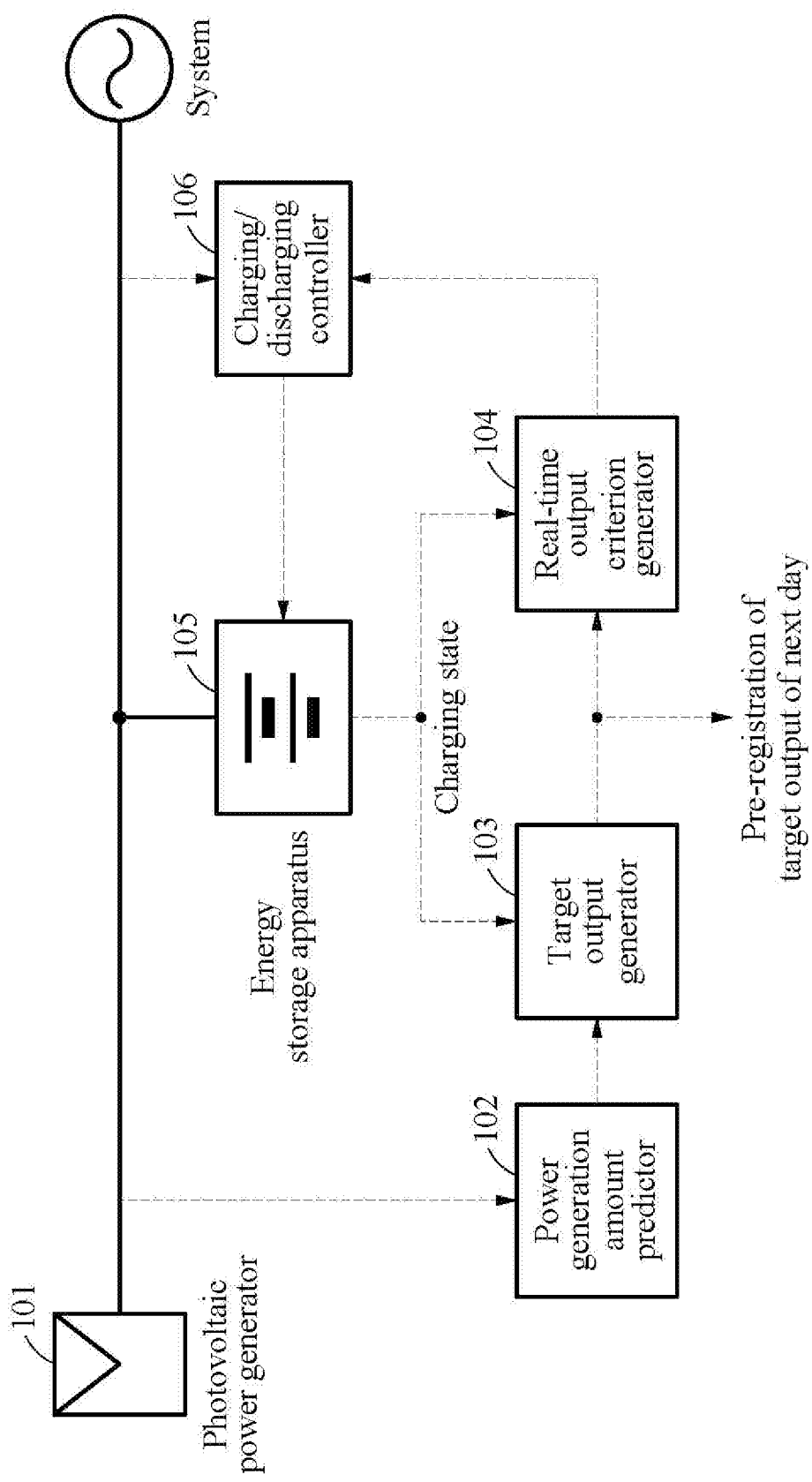
FIG. 1 is a drawing illustrating a structure of an output controlling apparatus for controlling an output of an energy storage apparatus to increase a reliability of a photovoltaic power generator according to an example embodiment.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a drawing illustrating a structure of an output controlling apparatus for controlling an output of an energy storage apparatus to increase a reliability of a photovoltaic power generator according to an example embodiment.

An amount (hereinafter, referred to as a "power generation amount") of power to be generated by a photovoltaic power generator 101 of FIG. 1 may vary depending on an environment. An energy storage apparatus 105 of FIG. 1 may perform charging or discharging based on the power generation amount of the photovoltaic power generator 101 to ensure a predetermined power generation amount. In the present disclosure, the output controlling apparatus may control charging or discharging of the energy storage apparatus 105.

Thus, a total power generation amount of a photovoltaic power generation apparatus including the output controlling apparatus, the photovoltaic power generator 101 and the energy storage apparatus 105 may be a sum of an output from the photovoltaic power generator 101 to a system and an output from the energy storage apparatus 105 to the system.

The output from the energy storage apparatus 105 to the system may correspond to discharging of the energy storage apparatus 105. Thus, an output to the system may vary depending on a charging state of the energy storage apparatus 105. The charging state of the energy storage apparatus 105 may be expressed in a percentage.

When an amount of power generated by the photovoltaic power generator 101 is greater than a target power generation amount, a portion of the power generated by the photovoltaic power generator 101 may be used for charging of the energy storage apparatus 105 and the remaining power may be output to the system. The system may refer to a power supply system.

When the amount of power generated by the photovoltaic power generator 101 is less than the target power generation amount, the output controlling apparatus may ensure a reliability by achieving the target power generation amount through the output from the energy storage apparatus 105 to the system.

The output controlling apparatus may include a power generation amount predictor 102, a target output generator 103, a real-time output criterion generator 104 and a charging/discharging controller 106, to control an output of the energy storage apparatus 105.

The power generation amount predictor 102, the target output generator 103, the real-time output criterion generator 104 and the charging/discharging controller 106 may each correspond to separate processors, or may correspond to a single processor.

Thus, the power generation amount predictor 102, the target output generator 103, the real-time output criterion generator 104 and the charging/discharging controller 106 may be operated by a processor included in the output controlling apparatus.

The power generation amount predictor 102 may predict a next day's power generation amount by monitoring electricity produced from the photovoltaic power generator 101. For example, the power generation amount predictor 102 may utilize weather information together, and may predict the next day's power generation amount based on power generation amount information that is obtained in advance, using an artificial intelligence technology such as deep learning. The predicted next day's power generation amount may be represented in units of time for 24 hours.

The target output generator 103 may determine a target output of the next day based on the next day's power generation amount received from the power generation amount predictor 102. For example, the target output may be determined to be the same as the next day's power generation amount. The target output may correspond to a sum of the output from the photovoltaic power generator 101 to the system and the output from the energy storage apparatus 105 to the system.

The target output generator 103 may modify and finally determine the target output based on the charging state of the energy storage apparatus 105. The target output generator 103 may verify a last charging state of the energy storage apparatus 105 before generating the target output of the next day.

In an example, when the charging state is greater than a preset reference state, the target output generator 103 may increase the target output. In another example, when the charging state is less than the preset reference state, the target output generator 103 may decrease the target output. The charging state may be expressed as a percentage of a degree to which the energy storage apparatus 105 is charged, and the reference state may also be expressed in a percentage and may be an arbitrarily determined constant.

For example, the target output generator 103 may modify an initially determined target output based on the charging state of the energy storage apparatus 105, based on Equation 1 shown below.

$$Pf = Pi \times (1 - c \times (Sref - Sn))$$ [Equation 1]

In Equation 1, Pf denotes a modified target output, Pi denotes an initial target output, c denotes a constant, Sref denotes a reference state, and Sn denotes a charging state. When Sn is greater than Sref, Pf may be greater than Pi. When Sn is less than Sref, Pf may be less than Pi. Also, when c increases, an influence of c may also increase.

The generated target output may refer to a target power generation amount of power to be generated by the photovoltaic power generation apparatus on the next day. The target output may be bid or registered on a next day's power generation market of a power exchange.

The real-time output criterion generator 104 may generate an output criterion corresponding to the total power generation amount obtained by the sum of the output from the photovoltaic power generator 101 to the system and the output from the energy storage apparatus 105 to the system in units of time when the photovoltaic power generation apparatus operates on the day.

The real-time output criterion generator 104 may generate an output criterion based on the determined target output and the charging state of the energy storage apparatus 105. Thus, based on a change in the charging state, the output criterion may also change in real time. Also, when the target output changes due to a change in a time slot, an output criterion corresponding to the charging state may be generated based on the changed target output.

In an example, when the charging state is greater than the preset reference state, the output criterion may be determined to be greater than the target output. In another example, when the charging state is less than the preset reference state, the output criterion may be determined to be less than the target output.

When the output criterion is increased, power of the energy storage apparatus 105 may be discharged based on a degree of increase in the output criterion, thereby lowering the charging state. When the output criterion is reduced, the energy storage apparatus 105 may be charged with power corresponding to a degree of reduction in the output criterion, thereby increasing the charging state. For example, when the charging state is the same as the reference state, the output criterion may be determined to be the same as the target output.

For example, the real-time output criterion generator 104 may generate an output criterion based on target outputs for each time unit and the charging state of the energy storage apparatus 105 using Equation 2 shown below.

$$Po = Pt \times (1 - c \times (Sref - Sn))$$ [Equation 2]

In Equation 2, Po denotes an output criterion of each time slot, Pt denotes a target output for each time, c denotes a constant, Sref denotes a reference state, and Sn denotes a charging state. When Sn is greater than Sref, Po may be greater than Pt. When Sn is less than Sref, Po may be less than Pt. Also, when c increases, an influence of c may also increase.

The charging/discharging controller 106 may control the output of the energy storage apparatus 105 such that the sum of the output from the photovoltaic power generator 101 to the system and the output from the energy storage apparatus 105 to the system satisfies the output criterion generated by the real-time output criterion generator 104.

In an example, when the power generation amount of the photovoltaic power generator 101 increases, the charging/discharging controller 106 may reduce the output from the energy storage apparatus 105 to the system and may control a sum of an output of the photovoltaic power generator 101 and an output of the energy storage apparatus 105 to be the same as the output criterion.

In another example, when the power generation amount of the photovoltaic power generator 101 decreases, the charging/discharging controller 106 may increase the output of the energy storage apparatus 105 and may control the output criterion to be satisfied. The output of the energy storage apparatus 105 by the charging/discharging controller 106 may be determined as shown in Equation 3 below.

$$Pe = Pref - Ppv$$ [Equation 3]

In Equation 3, Pe denotes the output of the energy storage apparatus 105, Pref denotes an output criterion, and Ppv denotes the output of the photovoltaic power generator 101. When an output of a photovoltaic power generation changes at a constant output criterion, the output of the energy storage apparatus 105 may also change. Pe may be a positive number, which may indicate discharging. Also, Pe may be a negative number, which may indicate charging.

Figure 2:
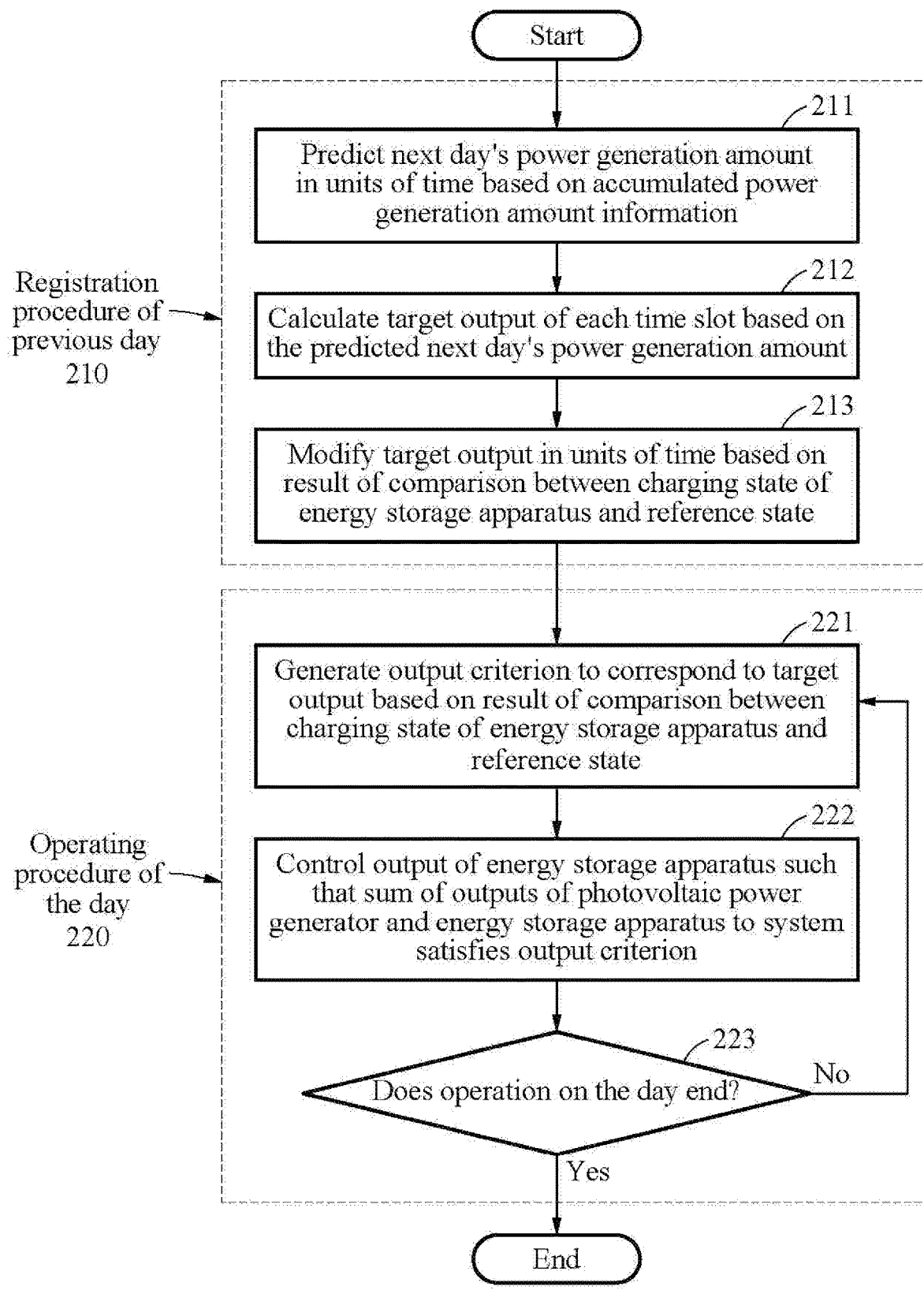
FIG. 2 is a flowchart illustrating an output controlling method of an energy storage apparatus to increase a reliability of a photovoltaic power generator according to an example embodiment.

FIG. 2 is a flowchart illustrating an output controlling method of an energy storage apparatus to increase a reliability of a photovoltaic power generator according to an example embodiment.

The output controlling method of FIG. 2 is divided into a registration procedure 210 of the previous day and an operating procedure 220 of a photovoltaic power generation apparatus on the day. The registration procedure 210 may be a procedure performed once on the day before the photovoltaic power generation apparatus operates.

In operation 211, the power generation amount predictor 102 predicts a next day's power generation amount in units of time based on accumulated power generation amount information. In operation 212, the target output generator 103 calculates a target output of each time slot based on the predicted next day's power generation amount.

In operation 213, the real-time output criterion generator 104 modifies the target output in units of time based on a result of comparison between the charging state of the energy storage apparatus 105 and the reference state. The modified target output may be registered in advance in a power exchange.

After the registration procedure 210 including operations 211 through 213, the operating procedure 220 including operations 221, 222 and 223 may be performed.

The operating procedure 220 may be a procedure performed in real time based on the target output registered on the previous day when the photovoltaic power generation apparatus operates on the day.

In operation 221, the real-time output criterion generator 104 generates an output criterion to correspond to the target output based on the result of comparison between the charging state of the energy storage apparatus 105 and the reference state.

In operation 222, the charging/discharging controller 106 controls an output of the energy storage apparatus 105 such that a sum of outputs of the photovoltaic power generator 101 and the energy storage apparatus 105 to a system satisfies the output criterion.

The charging state of the energy storage apparatus 105 may continue to change by charging and discharging operations during an operation of the photovoltaic power generation apparatus on the day. Also, since the target output is changed for each unit of time, the operating procedure 220 may be repeated until the operation of the photovoltaic power generation apparatus on the day ends in operation 203.

For example, a registration procedure of the previous day may be performed on one day before or before the day. The predicted power generation amount and the target output may be produced in units of 30 minutes or 2 hours, instead of 1 hour. Also, the target output may be registered in other institutes instead of the power exchange institute, and a value of the target output may be changed after registration.

Figure 3:
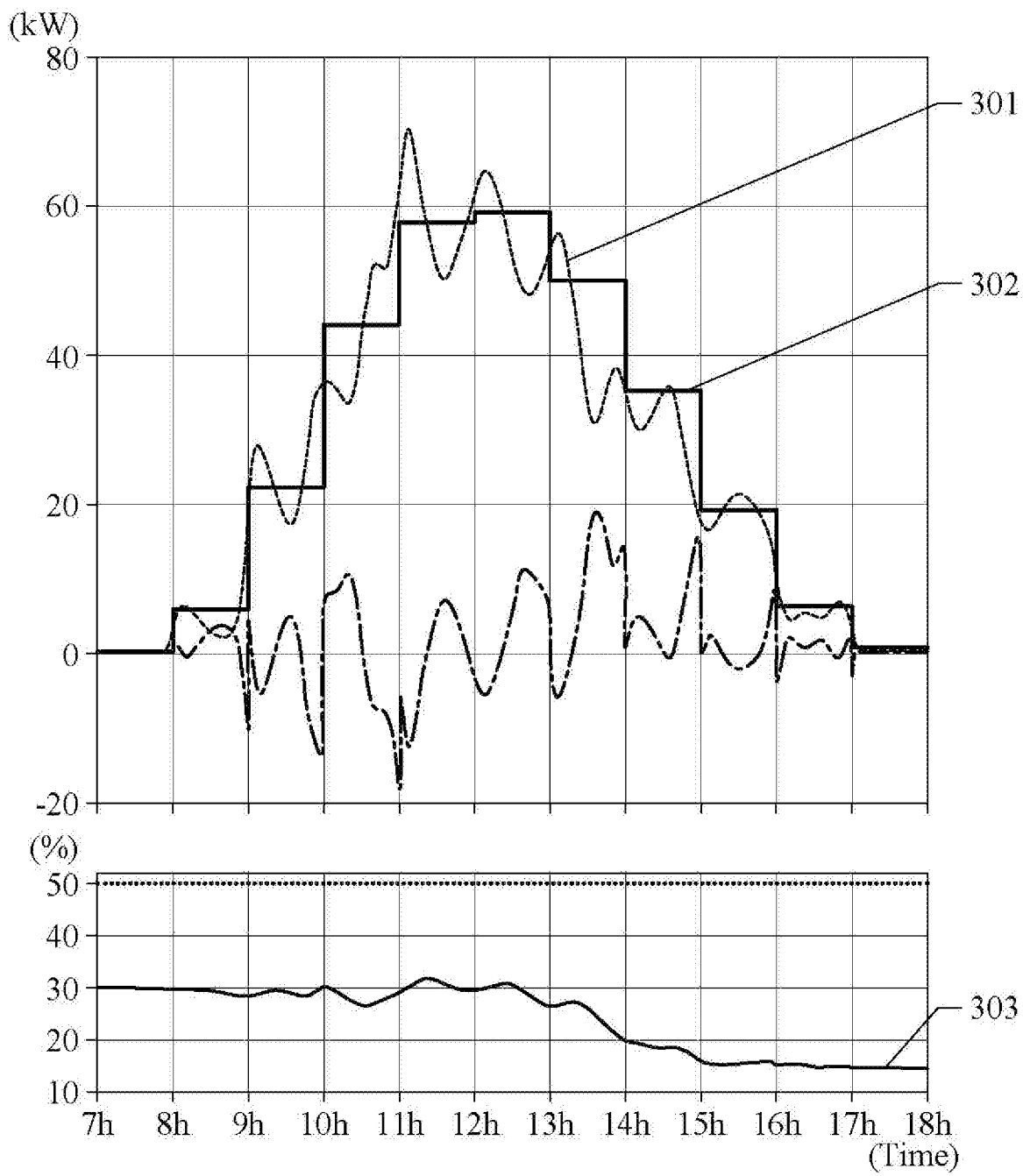
FIG. 3 illustrates a result obtained by controlling an output of an energy storage apparatus such that an output criterion follows a target output without modification of the target output according to an example embodiment.

FIG. 3 illustrates a result obtained by controlling an output of an energy storage apparatus such that an output criterion follows a target output without modification of the target output according to an example embodiment.

In a top graph of FIG. 3, a power generation amount 301 of a photovoltaic power generator and a target output 302 are expressed in kilowatts (kW) every hour during an operation of a photovoltaic power generation apparatus, by determining the target output 302 based on a photovoltaic power generation amount of a previous day predicted by a power generation amount predictor.

Also, a bottom graph of FIG. 3 shows a charging state 303 of the energy storage apparatus and a reference state over time during the operation of the photovoltaic power generation apparatus. In FIG. 3, the target output 302 is not modified regardless of the charging state 303 of the energy storage apparatus. Also, the output criterion is determined to be the same as the target output 302.

Since the target output 302 is different from the power generation amount 301 of the photovoltaic power generator, the energy storage apparatus may be controlled to compensate for a difference between the target output 302 and the power generation amount 301 such that a total power generation amount of the photovoltaic power generation apparatus may satisfy the target output 302. The charging state 303 of the energy storage apparatus may gradually decrease over time.

When an error between the predicted photovoltaic power generation amount and an actual power generation amount increases, the charging state 303 of the energy storage apparatus after the operation of the photovoltaic power generation apparatus may greatly change. When the above phenomenon is accumulated for a few days, the energy storage apparatus may be overcharged or overdischarged. The charging state may be severely changed based on a reduction in a capacity of the energy storage apparatus 105. Also, due to an error of the prediction of the power generation amount, the charging state may be more severely changed.

Figure 4:
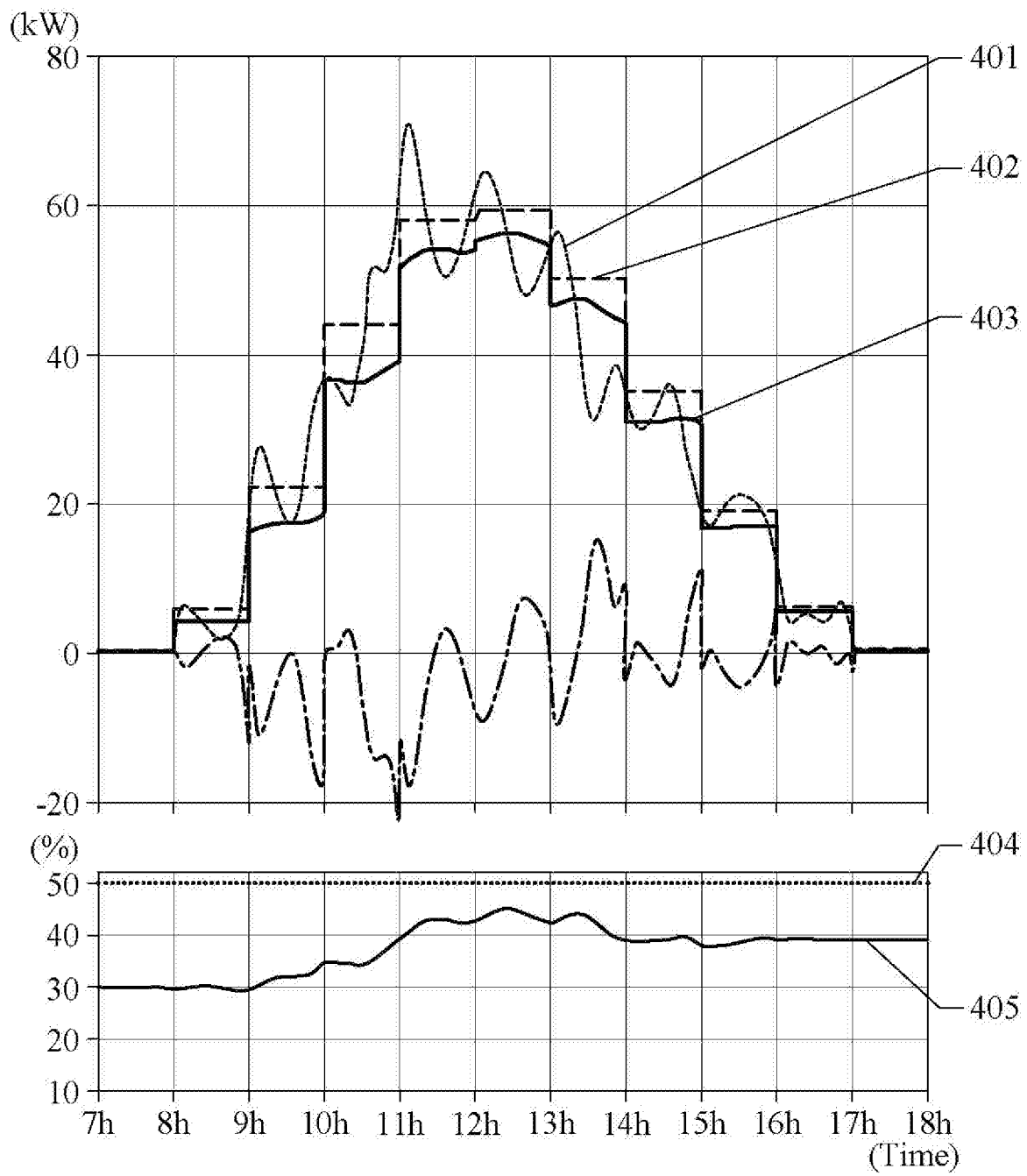
FIG. 4 illustrates a result obtained by controlling an output of an energy storage apparatus such that an output criterion is determined based on a charging state in real time without modification of the target output according to an example embodiment.

FIG. 4 illustrates a result obtained by controlling an output of an energy storage apparatus such that an output criterion is determined based on a charging state in real time without modification of the target output according to an example embodiment.

In a top graph of FIG. 4, a power generation amount 401 of a photovoltaic power generator, a target output 402 and an output criterion 403 are expressed in kW every hour during an operation of a photovoltaic power generation apparatus, by determining the output criterion 403 based on a charging state in real time by a real-time output criterion generator without modification of the target output 402. Since an output controlling apparatus controls the output of the energy storage apparatus to satisfy the output criterion 403, a total power generation amount of the photovoltaic power generation apparatus and the output criterion 403 are the same in FIG. 4.

Also, a bottom graph of FIG. 4 shows a charging state 405 of the energy storage apparatus and a reference state 404 over time during the operation of the photovoltaic power generation apparatus.

The power generation amount 401 of the photovoltaic power generator, the target output 402 and the charging state 405 of the energy storage apparatus at an initial stage are the same as conditions of FIG. 3. However, the output criterion 403 may be determined based on the charging state 405 of the energy storage apparatus, and accordingly the charging state 405 of the energy storage apparatus at a point in time at which the operation of the photovoltaic power generation apparatus ends is enhanced in comparison to the result of FIG. 3.

Referring to FIG. 4, when the charging state 405 of the energy storage apparatus is less than 50% that is the reference state 404, for a period of time from 8:00 at which the operation of the photovoltaic power generation apparatus begins to 17:00, the output criterion 403 may be determined to be overall lower than the target output 402. Also, the output criterion 403 may be determined based on a difference between the charging state 405 and the reference state 404. A small amount of power of the energy storage apparatus may be discharged due to the lowered output criterion 403, and thus the charging state 405 of the energy storage apparatus may be enhanced over time.

Figure 5:
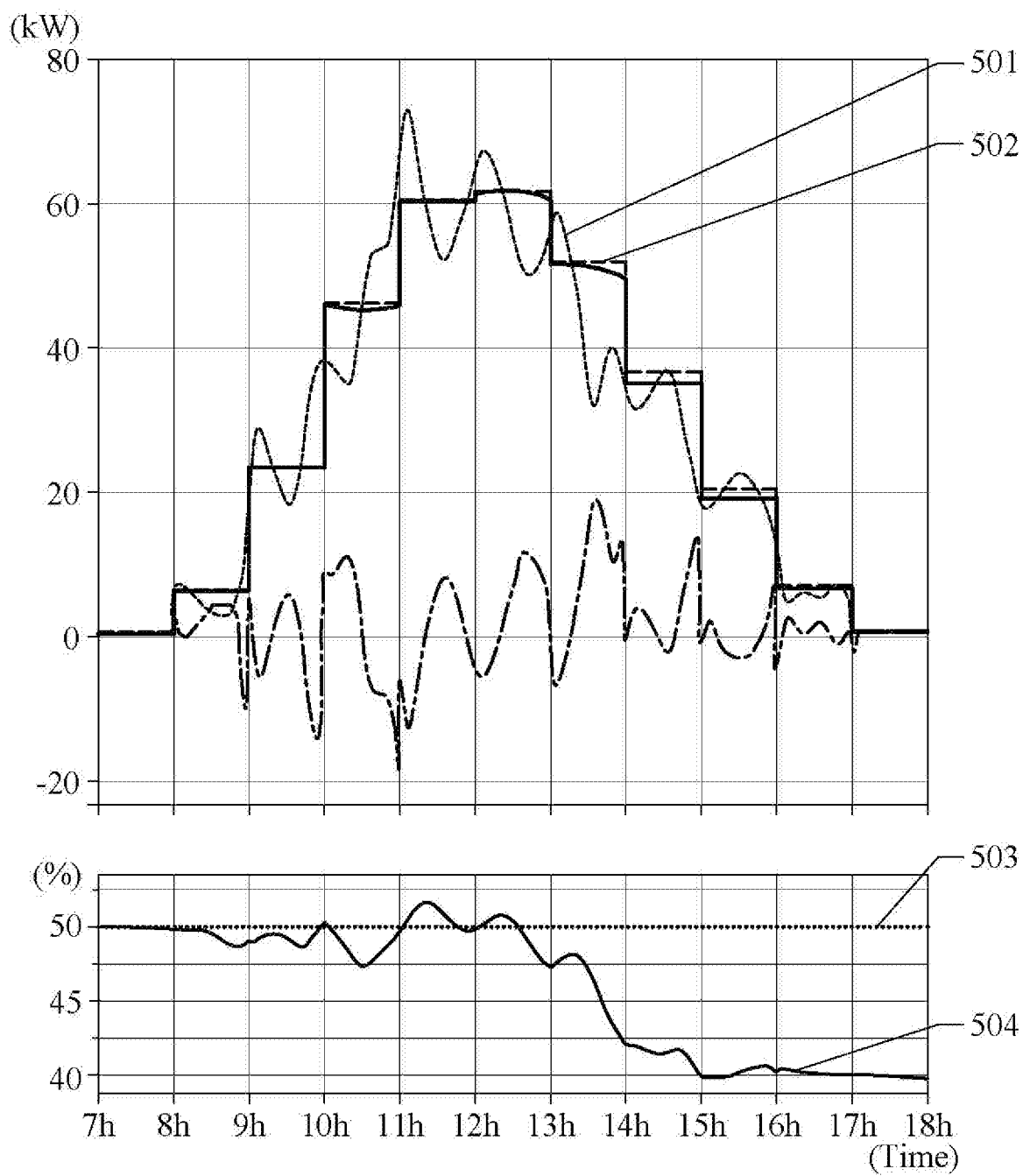
FIG. 5 illustrates a result obtained by controlling an output of an energy storage apparatus to follow an output criterion without modification of a target output when a charging state is the same as a reference state according to an example embodiment.

FIG. 5 illustrates a result obtained by controlling an output of an energy storage apparatus to follow an output criterion without modification of a target output when a charging state is the same as a reference state according to an example embodiment.

In a top graph of FIG. 5, a power generation amount 501 of a photovoltaic power generator and a target output 502 are expressed in kW under the same condition as that of FIG. 4. Since an output controlling apparatus controls the output of the energy storage apparatus to satisfy the output criterion, a total power generation amount of a photovoltaic power generation apparatus and the output criterion are the same in FIG. 5.

Also, a bottom graph of FIG. 5 shows a charging state 504 of the energy storage apparatus and a reference state 503 over time during an operation of the photovoltaic power generation apparatus. However, unlike FIG. 4, the charging state 504 of the energy storage apparatus is the same as the reference state 503 at 7:00.

In FIG. 5, the target output 502 is not modified because the reference state 503 and the charging state 504 of the energy storage apparatus are the same in a process of determining the target output 502 on a previous day.

Referring to FIG. 5, the charging state 504 and the reference state 503 are similar in a time slot of 7:00 to 8:00, and accordingly the output criterion is almost similar to the target output 502. However, since the charging state 504 is lowered due to a gradual increase in a difference between the charging state 504 and the reference state 503, the output criterion may be determined to be lower than the target output 502, during the operation of the photovoltaic power generation apparatus.

Figure 6:
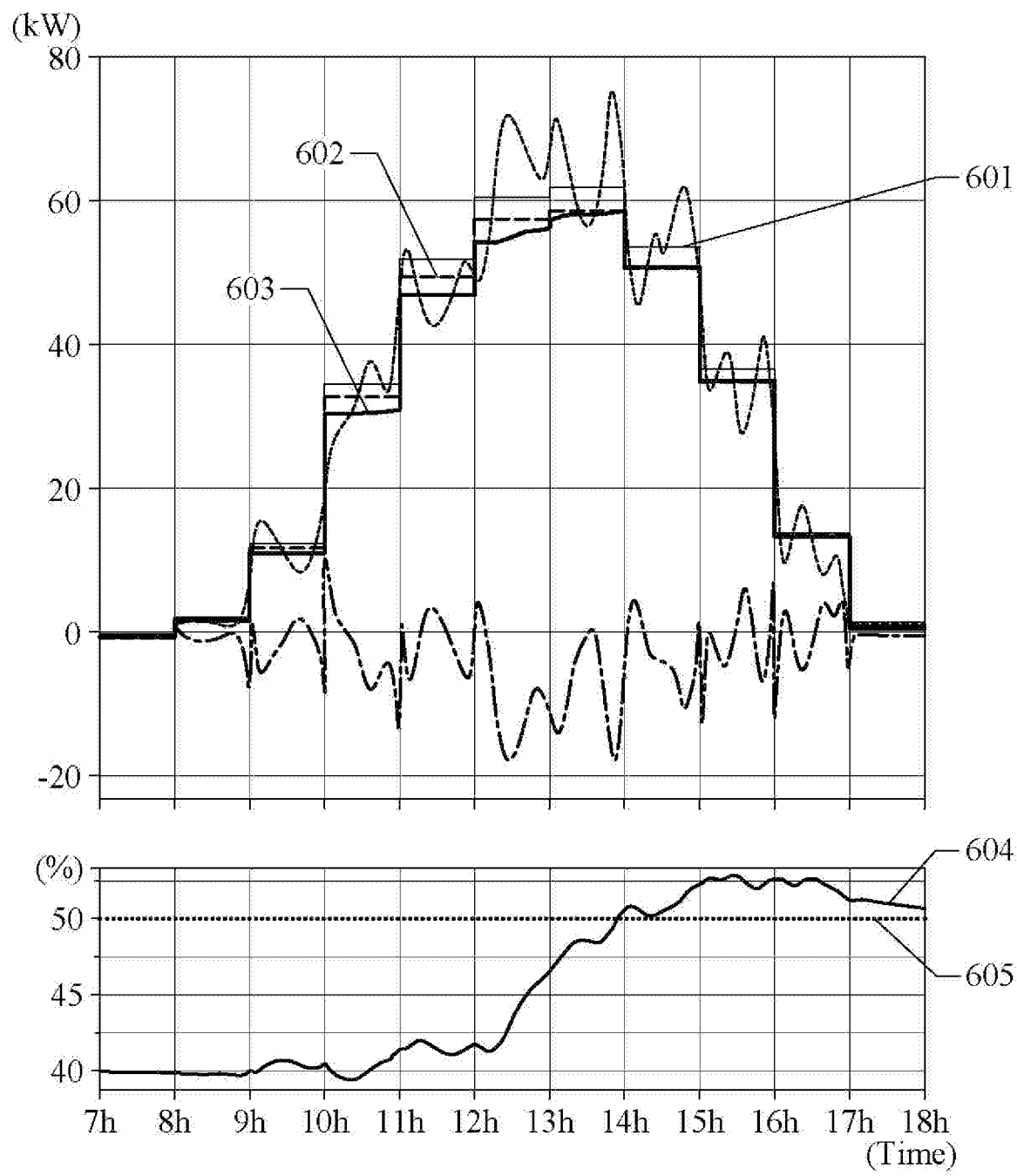
FIG. 6 illustrates a result obtained by controlling an output of an energy storage apparatus to follow an output criterion by lowering a target output when a charging state is less than a reference state according to an example embodiment.

FIG. 6 illustrates a result obtained by controlling an output of an energy storage apparatus to follow an output criterion by lowering a target output when a charging state is less than a reference state according to an example embodiment.

FIG. 6 illustrates an example in which a target output 601 is modified to be lowered to a target output 602 when a target output of a previous day is determined, because a charging state 604 of the energy storage apparatus is less than a reference state 605. Also, in FIG. 6, the output criterion 603 is determined to be low based on the target output 602.

When the low output criterion is determined to be low, a small amount of power of the energy storage apparatus may be discharged. Thus, the charging state 604 of the energy storage apparatus that is low in a time slot of 7:00 to 8:00 continues to increase and becomes similar to the reference state 605 at 18:00, that is, after an operation of a photovoltaic power generation apparatus ends.

In FIGS. 5 and 6, the photovoltaic power generation apparatus continues to operate on consecutive days, and the charging state 604 of the energy storage apparatus increases to be similar to the reference state 605 by modification of the target output by a target output generator.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Although this specification includes details of multiple specific implementations, the specific implementation details should not be construed as limitations on the scope of any inventions or of what may be claimed, but rather as descriptions of features specific to particular embodiments of particular inventions. Similarly, particular features that are described in this specification in the context of separate embodiments can also be implemented in combination in a single embodiment. Conversely, various features that are described in the context of a single embodiment can also be implemented in multiple embodiments separately or in any suitable sub-combination. Further, although features may be described above as acting in particular combinations and even initially claimed as such, in some cases, one or more features from a claimed combination can be excluded from the combination, and the claimed combination may be changed to a sub-combination or variation of a sub-combination.

While the present disclosure has been particularly shown and described with reference to an example embodiment thereof, it will be understood by those skilled in the art that various changes in form and details may be made therein without departing from the spirit and scope of the present disclosure as defined by the appended claims.

What is claimed is:

1. An output controlling apparatus comprising:
a power generation amount predictor configured to predict a next day's power generation amount of a photovoltaic power generator;
a target output generator configured to determine a target output in units of time based on the predicted next day's power generation amount and to modify the target output based on a charging state of an energy storage apparatus used for a photovoltaic power generation;
a real-time output criterion generator configured to generate an output criterion used for outputs from the photovoltaic power generator and the energy storage apparatus to a system in units of time based on the target output and the charging state of the energy storage apparatus; and
a charging/discharging controller configured to control charging and discharging of the energy storage apparatus such that an output to the system follows the output criterion.

2. The output controlling apparatus of claim 1, wherein the power generation amount predictor is configured to predict the next day's power generation amount through a deep learning, based on weather information and information collected by monitoring power generated from the photovoltaic power generator.

3. The output controlling apparatus of claim 1, wherein:
the target output generator is configured to increase the target output when the charging state of the energy storage apparatus is greater than a preset reference state, and
the target output generator is configured to reduce the target output when the charging state of the energy storage apparatus is less than the preset reference state.

4. The output controlling apparatus of claim 1, wherein:
the real-time output criterion generator is configured to set the output criterion to be greater than the target output, when the charging state of the energy storage apparatus is greater than a preset reference state, and the real-time output criterion generator is configured to set the output criterion to be less than the target output when the charging state of the energy storage apparatus is less than the preset reference state.

5. The output controlling apparatus of claim 1, wherein:
the charging/discharging controller is configured to reduce an output of the energy storage apparatus to the system when an output from the photovoltaic power generator to the system increases, and
the charging/discharging controller is configured to increase the output of the energy storage apparatus to the system when the output from the photovoltaic power generator to the system decreases.

6. An output controlling method comprising:
predicting a next day's power generation amount of a photovoltaic power generator;
determining a target output in units of time based on the predicted next day's power generation amount;
modifying the target output based on a charging state of an energy storage apparatus used for a photovoltaic power generation;
generating an output criterion used for outputs from the photovoltaic power generator and the energy storage apparatus to a system in units of time based on the target output and the charging state of the energy storage apparatus; and
controlling charging and discharging of the energy storage apparatus such that an output to the system follows the output criterion.

7. The output controlling method of claim 6, wherein the predicting of the next day's power generation amount comprises predicting the next day's power generation amount through a deep learning, based on weather information and information collected by monitoring power generated from the photovoltaic power generator.

8. The output controlling method of claim 6, wherein the modifying of the target output comprises:
increasing the target output when the charging state of the energy storage apparatus is greater than a preset reference state; and
reducing the target output when the charging state of the energy storage apparatus is less than the preset reference state.

9. The output controlling method of claim 6, wherein the generating of the output criterion in units of time comprises:
setting the output criterion to be greater than the target output when the charging state of the energy storage apparatus is greater than a preset reference state; and
setting the output criterion to be less than the target output when the charging state of the energy storage apparatus is less than the preset reference state.

10. The output controlling method of claim 6, wherein the controlling of the charging and discharging of the energy storage apparatus comprises:
reducing an output of the energy storage apparatus to the system when an output from the photovoltaic power generator to the system increases; and
increasing the output of the energy storage apparatus to the system when the output from the photovoltaic power generator to the system decreases.

* * * * *